Figure 1:
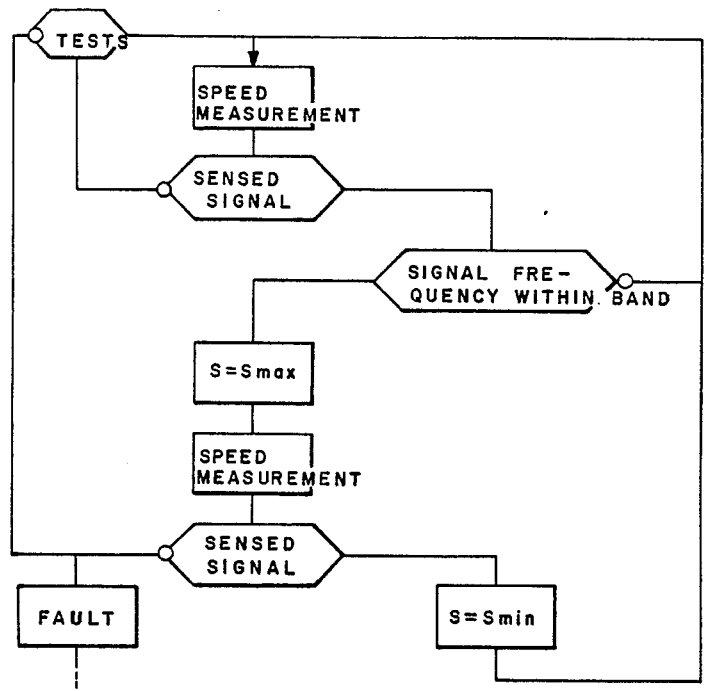

United States Patent [19]

Garnault

[11] Patent Number: 4,837,508

[45] Date of Patent: Jun. 6, 1989

[54] PROCESS AND DEVICE FOR CHECKING THE OPERATIONAL STATE OF A VARIABLE RELUCTANCE MAGNETIC SENSOR AND THEIR APPLICATION TO AUTOMOBILE ELECTRONICS

[75] Inventor: Joél Garnault, Sannois, France

[73] Assignee: Bendix France, Drancy, France

[21] Appl. No.: 170,212

[22] Filed: Mar. 18, 1988

[30] Foreign Application Priority Data

Mar. 20, 1987 [FR] France ................ 87 03877

[51] Int. Cl.$^4$ .............. G01P 3/488; G01P 21/02; G01R 31/06; B60T 8/32

[52] U.S. Cl. .................. 324/166; 324/173; 324/546; 340/514; 364/565

[58] Field of Search ............ 324/160, 161, 166, 173, 324/174, 207, 208, 546; 364/565; 340/514, 670, 671; 188/181 R; 310/168

[56] References Cited

U.S. PATENT DOCUMENTS

| | | | |
|---|---|---|---|
| 3,676,765 | 7/1972 | Westcott | 322/57 |
| 3,828,198 | 8/1974 | Florus et al. | 324/161 X |
| 3,976,954 | 8/1976 | Sapir | 330/69 |
| 4,320,662 | 3/1982 | Schaub et al. | 364/565 X |
| 4,341,995 | 7/1982 | Hennick | 324/161 |
| 4,575,664 | 3/1986 | Johnson | 324/161 X |

FOREIGN PATENT DOCUMENTS 2556257 6/1977 Fed. Rep. of Germany .

OTHER PUBLICATIONS

Patent Abstracts of Japan, vol. 10, No. 149 (P-461)[2206] 30 May 1986, & JP-A-61 3067 (Hitachi Seisakusho K.K.) 09-01-1986.

Primary Examiner—Gerald R. Strecker
Attorney, Agent, or Firm—Larry J. Palguta; Ken C. Decker

[57] ABSTRACT

The device includes a comparator (4) fed by a quasi-sinusoidal signal (3) delivered by a variable reluctance sensor, for converting alternations of the signal into pulses acceptable by digital computing means. According to the invention, the device includes a selectively connectable feedback resistor (R5) for varying the threshold of the comparator in such a way as to check, at a given frequency of the signal, the correctness of the amplitude of the signal (3) provided by the sensor. The device may be used for the checking of the operational state of a variable reluctance sensor delivering a signal indicating the speed of rotation of a shaft fitted in a motor vehicle.

10 Claims, 1 Drawing Sheet

PROCESS AND DEVICE FOR CHECKING THE OPERATIONAL STATE OF A VARIABLE RELUCTANCE MAGNETIC SENSOR AND THEIR APPLICATION TO AUTOMOBILE ELECTRONICS

The present invention relates to a process and a device for checking the operational state of a variable reluctance magnetic sensor. More particularly, the invention also relates to the application of this process and this device to automobile electronics.

In automobile electronics, variable reluctance sensors are currently used for measuring the speed of rotation of shafts such as a vehicle wheel axle or an output shaft of an engine driving this vehicle, a digital computer using the measured speed values in order to produce control signals for a wheel anti-locking device for example.

As these computers use digital signals, it is therefore appropriate to convert the quasi-sinusoidal analog signal supplied by a variable reluctance sensor into logic pulses which can be assimilated by the computers. In order to do this, a comparator is commonly used to form a series of pulses associated with the alterations of the quasi-sinusoidal signal formed by the sensor, the counting of these pulses by the computer enabling the shaft speed to be determined.

The amplitude of the quasi-sinusoidal signal provided by a variable reluctance sensor depends on the speed of rotation of the shaft and also on the air-gap width, i.e. on the distance which separates the sensor from a toothed disk turning with the shaft, a distance fixed by a mechanical adjustment. At constant speed, when this distance increases, the amplitude of the signal decreases. This decrease can make the signal unusable. Now, in certain difficult environments, such as that of the engine of an automobile vehicle, vibrations can modify the adjustment of this distance, for example by loosening the means of fixing the sensor. It is therefore appropriate to be able to periodically check that the air-gap width is not such that it prevents the provision of a usable signal by the sensor. Checking by conventional mechanical measuring means such as gases, shims, etc., is not practicable in the application mentioned above because of the difficulty of access to the sensor and of the periodic and frequent nature of this check, which would make it costly.

In addition, the attenuation of the signal from the sensor can also result from a partial short-circuit of its electrical winding, or from a buckle in the toothed wheel attached to the measured shaft. It is appropriate that the consequences of such types of damage can be detected by a periodic checking of the amplitude of the signal delivered by the sensor.

It is therefore an object of the present invention to provide a process and to produce a device enabling such checks by purely electronic means, capable of being automatically implemented by digital computing means making use of the speed data contained in the signal delivered by the sensor.

This object of the invention is obtained with a process for checking the operational state of a variable reluctance magnetic sensor used for measuring the speed of a moving object, this sensor providing a quasi-sinusoidal electrical signal which feeds an adjustable threshold comparator supplying electrical pulses whose frequency represents the speed of the moving object, this process being characterized in that the detected speed is compared with a predetermined range of speeds, the threshold of the comparator is adjusted to a test value if the detected speed is located within this range, this test value being higher than the threshold value of the sensor in normal operation, and the existence of a functional fault in the sensor is detected by the possible non-production of a signal by the comparator when the value of the threshold of the comparator is adjusted to the test value.

For the implementation of this process the invention enables the production of a device, including an adjustable threshold comparator differentially fed by a variable reluctance sensor delivering a quasi-sinusoidal signal representing the speed of the moving body, this comparator forming a train of pulses whose frequency depends on the speed of the moving body, this device being characterized in that it includes means for determining the position of the instantaneous frequency of the output signal of the comparator with respect to a predetermined frequency range, means for adjusting the threshold value of the comparator to a test value higher than the threshold value in normal operation, in response to a control signal validated by the presence of the instantaneous frequency of the output signal of the comparator within the predetermined frequency range, and means for signalling sensitive to the non-production of signals by the threshold comparator functioning at the test value, in order to deliver a signal signifying an operational fault in the sensor.

In its application to automobile electronics, the device according to the invention is associated with or built into a cmputer making use of the signal provided by the comparator in order to carry out computations taking account of the speed or rotation of a rotating member forming part of an automobile vehicle, the execution of these computations being subordinate to the validation of the signal representing the speed of the member, following the transmission by the computer of the control signal of the means of adjustment of the threshold of the comparator of the device to the test value.

Figure 2:
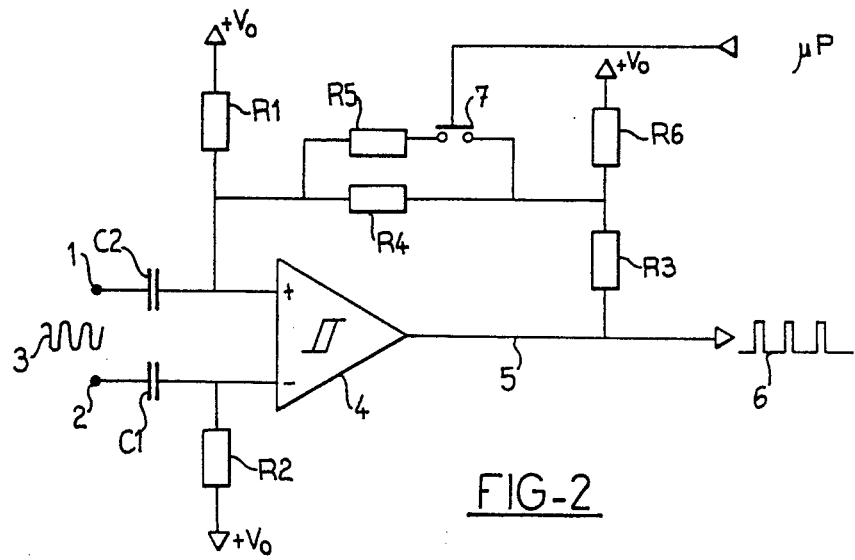

In the appended drawing, given by way of example only:

FIG. 1 is a flowchart which illustrates the algorithm implemented by the process according to the invention and, FIG. 2 is a diagrammatic representation of an embodiment of the device according to the invention.

Reference is firstly made to FIG. 2 wherein the shown device is fed between terminals 1 and 2 with a signal 3 delivered by a variable reluctance sensor. In the application to automobile electronics mentioned above, such a sensor is associated with a toothed wheel rotating coaxially with the shaft whose speed of rotation is required to be measured. During the rotation of the disk, there is a variation of the sensor-toothed wheel air-gap because of the presence of these teeth and the signal delivered by the sensor has a quasi-sinusoidal waveform. This signal 3 differentially feeds the inverting and non-inverting inputs of a threshold comparator 4 constituted, for example, by an operational amplifier connected as a comparator. Capacitors C1 and C2 provide a capacitive link between the output of the sensor and the input of the comparator 4. The differential feeding of the comparator is completed by a bridge of resistors $R_1$, $R_2$ respectively connected to the non-inverting input and to the inverting input of the comparator, the other terminals of the resistors $R_1$, $R_2$ being connected to a bias voltage source $+V_O$ as is conventional for differential feeding. The output 5 of the comparator 4 delivers a train of pulses 6 whose frequency represents the frequency of the signal 3 supplied by the sensor, and therefore of the speed of rotation of the measured shaft. This shaft can, for example, carry a wheel of an automobile vehicle. In this application, the measurement of the speed of rotation of one or more wheels of the vehicle can be used in order to derive from it an appropriate control of an anti-locking device for the wheels of the vehicle.

According to the invention, the comparator 4 used is an adjustable threshold comparator. In order to do this it is possible, for example, to vary the value of the resistance of a feedback circuit constituted from resistors R3, R4, R5, this feedback circuit being connected between the output 5 of the comparator and its non-inverting input. It will be noted that the device also includes a resistor R6 connected in series with the resistor R3, between the output 5 of the comparator and the voltage source $+V_O$. According to the present invention, the device includes adjusting means constituted by the resistor R5, a switching device 7 placed in series with this resistor R5 across the terminals of the resistor R4, and a source of a control signal for this switching device, in order to adjust the threshold value of the comparator 4 to a test value which is different from the threshold value used in the normal operation of the comparator. In normal operation, the latter simply delivers a train of pulses 6 suitable for processing by digital computing means, this train of pulses representing the speed of rotation of the measured shaft. The control signal closes the switching device 7 which has the effect of connecting the resistor R5 in parallel with the resistor R4, an assembly whose equivalent resistance obviously has a value which is different from that of the resistor R4 alone. The threshold value established by the resistor R4 alone in circuit is equal to a predetermined value $S_{min}$ while the threshold value established when the resistor R5 is in circuit corresponds with a test value $S_{max}$ higher than the value $S_{min}$. The advantage of this arrangement will be explained hereafter in association with the description of the process according to the invention.

Reference is made to FIG. 1 of the accompanying drawing in which there has been shown a flowchart illustrating the algorithm whose execution enables the implementation of the process of checking the operational state of the sensor according to the invention. The measurement of the speed of rotation of the measured shaft being carried out while the threshold of the comparator 4 is adjusted to the value $S_{min}$, the absence of signal at output 5 of the comparator can be interpreted as resulting from the absence of the signal 3 at the output of the sensor or, more generally, from the inadequacy of the amplitude of this signal 3. Such an inadequate amplitude can result for example from an air-gap larger than the nominal value, a short-circuit of part of the winding of the sensor, a pre-magnetization or even from a buckle in the toothed wheel which turns in front of the sensor. It can also result from an insufficient speed of the moving body, not suitable for the provision by the sensor of a signal of amplitude higher than the threshold of the comparator.

Tests are therefore performed in order to determine if it is possible that an insufficient speed of the moving body can be responsible for the absence of the signal. If this is not the case, signalling means alert the computation means and, possibly, a display unit enabling the driver of the vehicle to be informed of the failure of the sensor used.

In the opposite case, the procedure illustrated by the flowchart is restarted at its beginning until the appearance of a signal at the output of the comparator. In practice this corresponds with the situation in which the speed of the moving body increases from a zero value until it reaches a value which corresponds with the threshold value of the comparator.

If the production of a correct train of pulses at the output of the comparator is then observed, the threshold of this comparator being adjusted to the value $S_{min}$, it cannot however be deduced that the sensor is functioning correctly. In fact, for example, the production of a signal of sufficient amplitude by the sensor can result from a rotation of the shaft at a speed higher than the range of speeds in which it is desired to measure the speed of rotation of the shaft since it is known that the amplitude of the signal provided by the sensor is not only dependent on the sensor-toothed disk air-gap width but also on the speed or rotation of the shaft. It is therefore appropriate to check that the operation of the sensor is correct in the useful range of speeds of the application concerned.

In order to do this, the frequency of the output signal of the sensor is compared with the frequency band corresponding with the useful speed range. If the frequency of the signal is not included in this band, the measurement is restarted in such a way that it is carried out when the speed of the shaft is situated within the speed range concerned. If, on the other hand, the frequency of the signal is well inside the useful band, the threshold of the sensor is adjusted, according to the invention, to the value $S_{max}$, higher than the value $S_{min}$, in order to test the operation of the device with this new threshold value. If the speed measurement is still possible, and in consequence a signal is obtained at the output of the sensor, it is deduced that the amplitude of the signal provided by the sensor, in the considered speed range, is sufficient to be considered as representing a correct operational state of the sensor. It is then possible to switch the threshold level of the sensor back to the value $S_{min}$ and to resume the current speed measurements. If, on the other hand, with the threshold of the comparator adjusted to the test value, a disappearance of the signal at the output of the comparator 4 is observed, it is deduced from this that the amplitude of the signal delivered by the sensor is insufficient to provide correct measurements in the speed range concerned. This insufficient amplitude signifies that there is an operational fault in the sensor, a fault resulting for example from an exaggerated enlargement of the air-gap, a short-circuit, at least partial, of the winding of the sensor, a pre-magnetization or from a buckle in the toothed wheel, etc. The fault is indicated to the means of computation associated with the device according to the invention so that these means of computation can take the failure of the sensor into account. A display device can also be actuated in order to signal the existence of the fault to the driver of the vehicle. The latter is therefore warned of the necessity of carrying out an appropriate maintenance of the sensor in order to ensure the correct operation of the measuring device.

In the application envisaged above, for which a computer makes use of the measurements of wheel speeds of a vehicle in order to control an anti-locking device for these wheels, the control signal which triggers the closing of the switching device 7 and the execution of a checking of the operational state of a sensor can be generated by the computer itself, in preparation for computations making use of these speeds, in order to be ensured of the validity of the measurements of these speeds. The switching device can therefore be constituted by a digitally controlled analog switch, of 4066 type for example, controlled by a signal provided by a microprocessor $\mu$P forming part of the computer.

In practice, the signal delivered by the sensor can be affected by various noises capable of disturbing the operation of the comparator. In order to filter these noises, it is convenient to use a hysteresis comparator.

The scope of the invention would of course not be departed from in foreseeing the inclusion in circuit of several different resistors each associated with a different threshold value, this being at the price of a less economic embodiment of the device according to the invention. On the other hand, such an arrangement would enable the obtaining of a genuine measurement of the amplitude of the analog signal provided by the sensor and not only of the position of this amplitude with respect to a specified amplitude value.

The test value of the comparator threshold could also be corrected as a function of the instantaneous speed of the moving body in order to avoid the comparison of this speed with the useful speed range, at the cost of a slightly increased complexity of the device according to the invention.

In general terms, the present invention applies to the conversion of an analog signal into a logic signal and, more particularly, to the processing of the signal delivered by a variable reluctance magnetic speed sensor without this application being limiting. In fact, the invention extends to the establishment of a diagnostic routine or a measurement of the amplitude of the periodic analog signal processed by a device converting this signal into logic signals, by controlled modification of the threshold of a comparator used for this conversion.

I claim:

1. A process for checking the operational state of a variable reluctance magnetic sensor used for measuring the speed of a moving object, said sensor providing a quasi-sinusoidal electrical signal which feeds an adjustable threshold comparator which supplies electrical pulses whose frequency represents the detected speed of said moving object, the process comprising the steps of:
    verifying that said frequency is included within a frequency band corresponding to a useful speed range; and, if said frequency is included within said frequency band;
    switching an amplitude threshold value of said comparator from an operational value to a test value which is higher than said operational value; and
    verifying the presence of said electrical pulses at an output of said comparator while the threshold value is adjusted to the test value.

2. The process according to claim 1, wherein the two last steps are successively repeated with a series of increasing test values in order to determine the amplitude of said quasi-sinusoidal signal.

3. A device comprising an adjustable threshold comparator for checking the operational state of a variable reluctance magnetic sensor used for measuring the speed of a moving object, said sensor providing a quasi-sinusoidal signal which is fed to said comparator which supplies electrical pulses whose frequency represents the detected speed of the moving object, said device also comprising:
    means for verifying that said frequency is included within a frequency band corresponding to a useful speed range and delivering a control signal if said frequency is within said frequency band;
    means for switching an amplitude threshold value of said comparator from an operational value to a test value higher than said operational value in response to said control signal; and
    signalling means sensitive to an absence of electrical pulses at an output of said comparator while the threshold value is adjusted to the test value, in order to deliver an operational fault signal.

4. The device according to claim 3, wherein said comparator is a hysteresis comparator.

5. The device according to claim 3, wherein said comparator is an operational amplifier which is capacitively coupled to said sensor and said means for switching said threshold value acts on the value of the impedance of a feedback circuit connected between an input and the output of said comparator.

6. The device according to claim 5, wherein said means for switching includes a switching device in series with a test value resistor for adjusting the threshold value, said switching device and said test value resistor being connected in parallel with a resistor forming part of said feedback circuit.

7. The device according to claim 6, wherein said switching device is a digitally controlled analog switch sensitive to said control signal and for connecting said test value resistor into said feedback circuit.

8. The device according to claim 7, further comprising a digital computer utilizing said pulses provided by said comparator in order to carry out computations that take into account said detected speed of the moving object, the execution of the computations being subordinate to the verification of said pulses following a transmission by the computer of said control signal for connecting said test value resistor.

9. The device according to claim 8, wherein said computer is connected with an automotive vehicle, said computer being sensitive to said detected speed of the moving object which comprises at least one rotating shaft of said vehicle.

10. The device according to claim 9, wherein said one rotating shaft carries a wheel of said vehicle.

* * * * *